(12) United States Patent
Hillier et al.

(10) Patent No.: US 9,214,090 B2
(45) Date of Patent: Dec. 15, 2015

(54) COMPUTER SYSTEMS FOR CAPTURING STUDENT PERFORMANCE

(71) Applicant: Distance EDU Learning, Inc., Las Vegas, NV (US)

(72) Inventors: James Hillier, Stanfield, NC (US); James Pulliam, Pioneertown, CA (US); Kevin Pulliam, Redlands, CA (US)

(73) Assignee: Distance EDU Learning, Inc., Las Vegas, NV (US)

( * ) Notice: Subject to any disclaimer, the term of this patent is extended or adjusted under 35 U.S.C. 154(b) by 0 days.

(21) Appl. No.: 14/094,663

(22) Filed: Dec. 2, 2013

(65) Prior Publication Data

US 2014/0087352 A1    Mar. 27, 2014

Related U.S. Application Data

(63) Continuation-in-part of application No. 13/688,049, filed on Nov. 28, 2012, now Pat. No. 8,600,289, which is a continuation of application No. 12/137,466, filed on Jun. 11, 2008, now Pat. No. 8,326,211, application (Continued)

(51) Int. Cl.
| | |
|---|---|
| *G09B 3/00* | (2006.01) |
| *G09B 7/00* | (2006.01) |
| *G09B 5/00* | (2006.01) |
| *G09B 7/02* | (2006.01) |
| *G09B 23/04* | (2006.01) |
| *G09B 7/04* | (2006.01) |

(52) U.S. Cl.
CPC .. *G09B 5/00* (2013.01); *G09B 7/02* (2013.01); *G09B 7/04* (2013.01); *G09B 23/04* (2013.01)

(58) Field of Classification Search
CPC ............ G09B 5/00; G09B 7/00; G09B 19/00; G06Q 50/20
USPC .................................. 434/322, 323, 350, 353
See application file for complete search history.

(56) References Cited

U.S. PATENT DOCUMENTS

| | | |
|---|---|---|
| 5,310,349 A | 5/1994 | Daniels et al. |
| 5,779,486 A | 7/1998 | Ho et al. |
| 5,810,605 A | 9/1998 | Siefert |

(Continued)

OTHER PUBLICATIONS

Grush, Mary, "The Application Service Provider Model at Drexel", Feb. 14, 2007, campustechnology.com.

(Continued)

*Primary Examiner* — Peter Egloff
*Assistant Examiner* — Jerry-Daryl Fletcher
(74) *Attorney, Agent, or Firm* — Knobbe Martens Olson & Bear LLP

(57) ABSTRACT

A method of capturing student performance can be provided that includes enabling a course creator to generate assessment data related to learning assessments for an online course and to generate learning outcomes for the online course, associating the assessment data with the learning outcomes, such that at least some of the learning assessments correspond to at least some of the learning outcomes, and generating an online classroom. The method may further include providing the learning assessments to students enrolled in the online course using the online classroom, wherein the students can generate completed learning assessments, and determining, for each of the completed learning assessments, whether one or more of the learning outcomes were met by each of the students.

6 Claims, 13 Drawing Sheets

Related U.S. Application Data

No. 14/094,663, filed on Dec. 2, 2013, which is a continuation-in-part of application No. 13/613,764, filed on Sep. 13, 2012, now abandoned, which is a continuation of application No. 12/137,418, filed on Jun. 11, 2008, now abandoned.

(60) Provisional application No. 60/943,286, filed on Jun. 11, 2007, provisional application No. 60/943,267, filed on Jun. 11, 2007, provisional application No. 60/943,284, filed on Jun. 11, 2007.

(56) References Cited

U.S. PATENT DOCUMENTS

| | | | |
|---|---|---|---|
| 6,149,438 | A | 11/2000 | Richard et al. |
| 6,149,441 | A | 11/2000 | Pellegrino et al. |
| 6,263,439 | B1 | 7/2001 | Hondros et al. |
| 6,314,425 | B1 | 11/2001 | Serbinis et al. |
| 6,325,632 | B1 | 12/2001 | Chao et al. |
| 6,357,010 | B1 | 3/2002 | Viets et al. |
| 6,430,549 | B1 | 8/2002 | Gershfield et al. |
| 6,463,460 | B1 | 10/2002 | Simonoff |
| 6,554,618 | B1 | 4/2003 | Lockwood |
| 6,606,479 | B2 | 8/2003 | Cook et al. |
| 6,652,287 | B1 | 11/2003 | Strub et al. |
| 6,691,153 | B1 | 2/2004 | Hanson et al. |
| 6,987,945 | B2 | 1/2006 | Corn et al. |
| 6,988,138 | B1 | 1/2006 | Alcorn et al. |
| 7,734,685 | B2 | 6/2010 | Cheng et al. |
| 7,788,207 | B2 | 8/2010 | Alcorn et al. |
| 2002/0042041 | A1 | 4/2002 | Owens et al. |
| 2002/0064766 | A1 | 5/2002 | Cozens et al. |
| 2004/0009461 | A1 | 1/2004 | Snyder et al. |
| 2004/0048233 | A1 | 3/2004 | Matthews et al. |
| 2004/0191744 | A1 | 9/2004 | Guirguis |
| 2005/0028005 | A1 | 2/2005 | Carson et al. |
| 2005/0202391 | A1 | 9/2005 | Allen et al. |
| 2006/0216683 | A1 | 9/2006 | Goradia |
| 2006/0228689 | A1 | 10/2006 | Rajaram |
| 2007/0020604 | A1 | 1/2007 | Chulet |
| 2007/0111184 | A1 | 5/2007 | Sperle |
| 2007/0154876 | A1 | 7/2007 | Harrison |
| 2007/0184426 | A1 | 8/2007 | Packard et al. |
| 2008/0014569 | A1 | 1/2008 | Holiday et al. |
| 2008/0268418 | A1 | 10/2008 | Tashner et al. |
| 2010/0017410 | A1* | 1/2010 | Pankaj et al. ............... 707/9 |
| 2010/0167257 | A1* | 7/2010 | Norwood et al. ............ 434/308 |

OTHER PUBLICATIONS

"Multitenancy" Source: http://en.wikipedia.org/w/index.php?oldid=491663581, Wikipedia, The Free Encyclopedia, Accessed on Apr. 23, 2012.
Office Action issued in U.S. Appl. No. 12/137,418 on Apr. 20, 2011.
Office Action issued in U.S. Appl. No. 12/137,418 on Feb. 17, 2012.
Office Action issued in U.S. Appl. No. 12/137,418 on Jul. 19, 2012.
Office Action issued in U.S. Appl. No. 12/137,418 on Sep. 20, 2011.
Office Action issued in U.S. Appl. No. 13/613,764 on Jan. 31, 2013.
Office Action issued in U.S. Appl. No. 13/613,764 on Sep. 18, 2013.
Response to Apr. 20, 2011 Office Action filed in U.S. Appl. No. 12/137,418 on Jun. 17, 2011.
Response to Sep. 20, 2011 Final Office Action filed in U.S. Appl. No. 12/137,418 on Dec. 20, 2011.
Response to Feb. 17, 2012 Office Action filed in U.S. Appl. No. 12/137,418 on May 16, 2012.
Response to Jan. 31, 2013 Office Action filed in U.S. Appl. No. 13/613,764 on Apr. 30, 2013.

* cited by examiner

Lesson Outcome Report
Lesson Outcome #1

| Student # | Homework 1 | Test 1 | Weighted Avg. | Outcome Met?<br>(Threshold: 85) |
|---|---|---|---|---|
| Student 1 | 85 | 90 | 89 | Yes |
| Student 2 | 70 | 80 | 77 | No |
| Student 3 | 100 | 95 | 96 | Yes |
| Student 4 | 90 | 90 | 90 | Yes |
| Student 5 | 77 | 82 | 81 | No |

*FIG. 7*

COMPUTER SYSTEMS FOR CAPTURING STUDENT PERFORMANCE

RELATED APPLICATIONS

This application is a continuation-in-part of U.S. application Ser. No. 13/688,049, filed Nov. 28, 2012, which is a continuation of U.S. application Ser. No. 12/137,466, filed Jun. 11, 2008, now U.S. Pat. No. 8,326,211, which claims priority from U.S. Provisional Application No. 60/943,286 filed Jun. 11, 2007, entitled "Performance Capture In Online Learning Environments," and from U.S. Provisional Application No. 60/943,267 filed Jun. 11, 2007, entitled "Accreditation-based course creation tools." This application is also a continuation-in-part of U.S. application Ser. No. 13/613,764, filed Sep. 13, 2012, which is a continuation of U.S. application Ser. No. 12/137,418, filed Jun. 11, 2008, which claims priority from U.S. Provisional Application No. 60/943,284, filed Jun. 11, 2007, titled "Online Learning Using an Application Service Provider Model." Each of the foregoing applications is hereby incorporated by reference in its entirety.

BACKGROUND

The Internet has provided educators with an efficient medium for delivering educational materials to a diverse, geographically remote audience. For example, many universities provide educational content to students via the Internet. Even some businesses offer continuing education and training to employees online. Online classes might include presentations of video lectures, written lecture notes, and the like.

Student performance in classes, including online classes, is often measured by grades. Grades can include letters, numbers, or other symbols indicating the relative quality of a student's work. Students receive grades based on their performance on various assessments, such as tests, quizzes, papers, and the like. Grades alone, however, provide only an approximate measure of student performance.

SUMMARY OF CERTAIN EMBODIMENTS

In various embodiments, a computer-implemented method of capturing student performance can be provided that includes enabling a course creator to generate assessment data related to learning assessments for an online course and to generate learning outcomes for the online course, associating the assessment data with the learning outcomes, such that at least some of the learning assessments correspond to at least some of the learning outcomes, and generating an online classroom. The method may further include providing the learning assessments to students enrolled in the online course using the online classroom, wherein the students generate completed learning assessments, and determining, for each of the completed learning assessments, whether one or more of the learning outcomes were met by each of the students.

Additionally, in certain embodiments, a system for measuring student performance can include a course creation module that can enable a course creator to generate learning outcomes for an online course and associate learning assessments with the learning outcomes, such that at least some of the learning assessments correspond to at least some of the learning outcomes. The system may further include an online classroom module that can generate an online classroom and provide the learning assessments to students enrolled in the online course using the online classroom, wherein the students can generate completed learning assessments. In addition, the system may also include a performance capture module that determines, for each of the completed learning assessments, whether one or more of the learning outcomes were met by each of the students.

In certain embodiments, a system for capturing student performance in an online educational course includes a course creation module accessible by a creator of an online educational course. The course creation module can enable the course creator to generate learning assessments for the online course and learning outcomes. The learning outcomes can include course outcomes that each have a desired objective for students to achieve in the online course and lesson outcomes that each have a desired objective for the students to achieve from one or more lessons. Each of the lesson outcomes can be related hierarchically to at least one of the course outcomes. The course creation module can also enable the course creator to associate at least some of the learning assessments with the learning outcomes, such that the at least some of the learning assessments correspond to at least one of the lesson outcomes.

Additionally, the system may further include an online classroom module that generates an online classroom, provides the learning assessments to the students in the online classroom, and automatically grades at least some of the learning assessments to produce graded learning assessments. Moreover the system may also include a performance capture module that determines, for each of the graded learning assessments, whether one or more of the learning outcomes were met.

BRIEF DESCRIPTION OF THE DRAWINGS

FIG. 7 illustrates an example report on student performance based on learning outcomes.

DETAILED DESCRIPTION OF CERTAIN EMBODIMENTS

Performance Capture Embodiments

Grades are used ubiquitously in education to provide approximate indicators of student performance. However, grades provide a one-dimensional view of student accomplishment. Grades themselves, for instance, tell how well students have performed relative to their peers but tell little about what students have learned. Likewise, grades fail to provide significant insights on how well a teacher has conveyed a subject to students.

Various embodiments herein describe enhanced systems and methods for capturing student performance. In certain embodiments, these systems and methods enable courses to be created based on desired learning outcomes. These learning outcomes may be associated with assessments. Student achievement of the learning outcomes may be measured based on their performance on the assessments. Likewise, teacher effectiveness may be gauged based on the students' learning outcome achievements.

Although the systems and methods described herein are described primarily in the context of online classes, these systems and methods may also be used with classes that are not conducted online. In addition, the systems and methods herein are not restricted to classes conducted by schools, but may also be used in corporate training, certificate programs, and other educational settings.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 1:
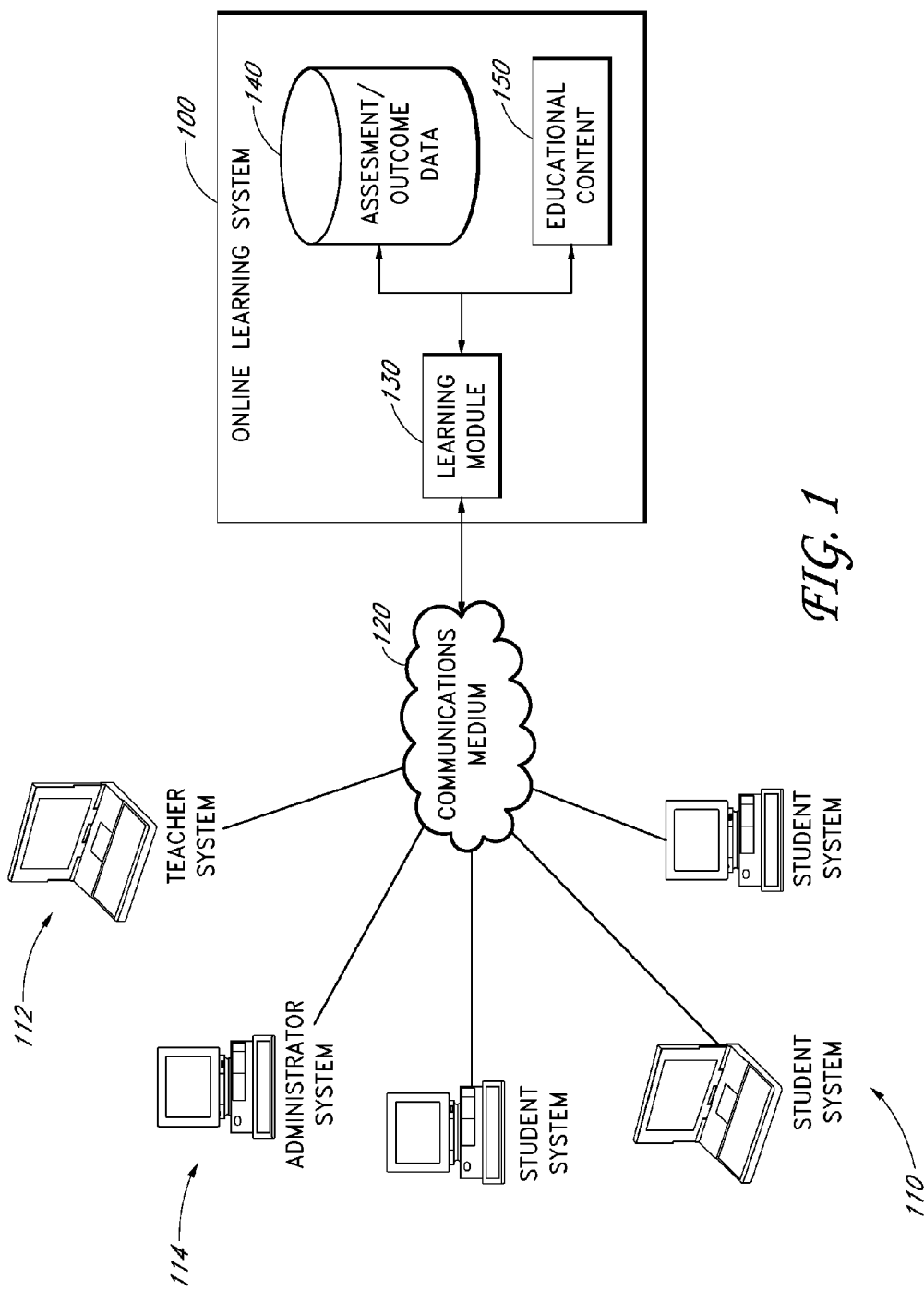
FIG. 1 illustrates a block diagram of an embodiment of an online learning system.

FIG. 1 illustrates an embodiment of an online learning system 100. The depicted embodiment of the online learning system 100 includes software components that can be implemented using one or more computer systems, such as servers (not shown). In certain embodiments, the online learning system 100 enables teachers and/or administrators to create courses according to desired learning outcomes. Advantageously, in certain embodiments the online learning system 100 captures student progress toward reaching the learning outcomes.

The online learning system 100 may be accessed by users such as students, teachers, and/or administrators over a communications medium 120 such as the Internet, a local or wide area network (LAN or WAN), or the like. The users can access the online learning system 100 using computer systems 110, 112. The computer systems 110, 112 can be any processor-based systems, such as desktops, laptops, tablet computers, personal digital assistants (PDAs), smart phones, ultra-portable computers, and the like. Students may access the online learning system 100 using the computer systems 110 to enroll in courses, receive instruction in interactive online classes, complete assessments, and the like. Teachers may access the online learning system 100 using the computer systems 112 to provide instruction to students, to create and manage courses, and the like. Administrators may also be able to access the online learning system 100 using the computer systems 114 to create courses, supervise instruction, and perform other administrative tasks.

In the depicted embodiment, the online learning system 100 includes a learning module 130, a database 140, and a file system 150. The learning module 130 can include one or more software components. In one embodiment, the learning module 130 is a software application server that provides access to applications, data, and the like.

In certain embodiments, the learning module 130 provides an online classroom in which students can receive instruction and take assessments. The online classroom may include one or more user interfaces for students, teachers, and administrators to access educational content on the file system 150 and/or in the database 140. The educational content can include, for example, multimedia presentations, lecture material, course files, and the like. The online classroom can also access student, teacher, and administrator personal data stored in the database 140 and/or file system 150. The user interfaces can be accessed by web browsers installed on the student, teacher, and administrator computer systems 110, 112, 114. Alternatively, an application other than a web browser can be used to access the online classroom.

The learning module 130 can also enable course creators such as teachers or administrators to create online courses based on one or more desired learning outcomes. The desired learning outcomes can be objectives that course creators desire the students to achieve for a given course. Course creators may generate the learning outcomes based on accreditation requirements in some embodiments. Accreditation requirements can include standards or desired competencies for courses defined by accreditation entities, such as the Accreditation Board for Engineering and Technology (ABET). For example, each accreditation requirement for a given course can be used as a learning outcome for that course. Alternatively, course creators may generate the learning outcomes based on the course creators' own criteria for student accomplishment. Course creators may also generate learning outcomes based on a combination of accreditation requirements and the course creators' own criteria.

Course creators can use the learning module 130 to associate the learning outcomes with assessments. Example assessments can include tests, exams, quizzes, essays, papers, projects, labs, presentations, oral reports, homework, research, class attendance, class participation, combinations of the same, and the like. An assessment associated with a learning outcome may test a student's mastery of the learning outcome. As an example, one possible learning outcome in an English class might be that students learn to recognize different sentence structures. An assessment associated with this learning outcome might test students on the different sentence structures.

The learning module 130 can measure students' learning outcome performance based at least in part on the students' performance on their assessments. For example, if a student performed well on an assessment such as a test, the learning module 130 may consider the student to have achieved a learning outcome associated with that test. The learning module 130 may store learning outcome results of students in the database 140, generate learning outcome reports for teachers and administrators, and recommend tutoring or other help to students who are not meeting learning outcomes. Using the learning outcome reports, teachers can also identify which students might need additional help. Teachers can also use the learning outcome reports self-diagnostically. If learning outcomes were missed by a number of students, for instance, teachers can identify areas where they may wish to adjust their teaching. Moreover, administrators can analyze learning outcome reports to supervise teachers.

Figure 2:
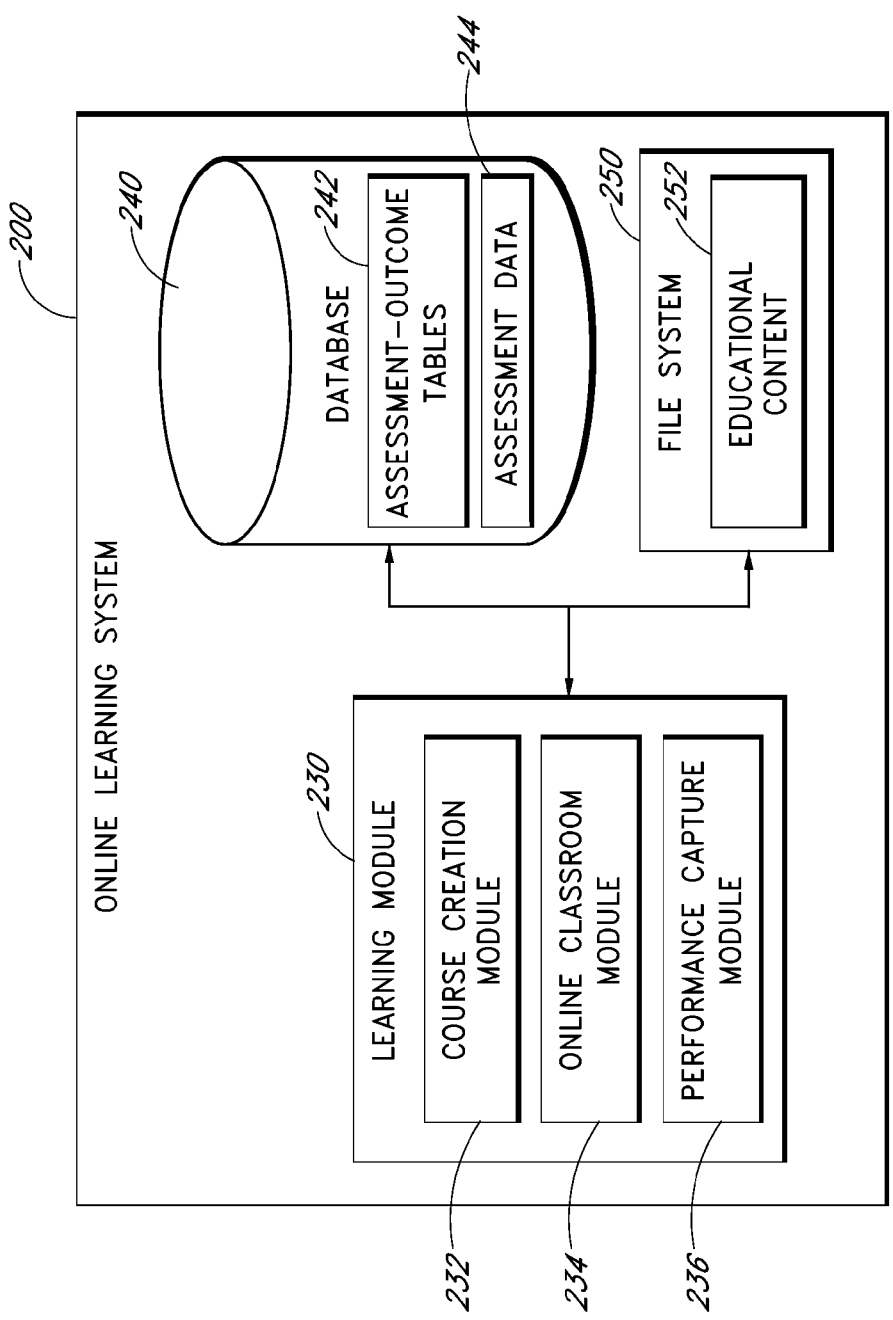
FIG. 2 illustrates a block diagram of another embodiment of the online learning system of FIG. 1.

FIG. 2 illustrates another embodiment of an online learning system 200. The depicted embodiment of the online learning system 200 includes software components that can be implemented using one or more computer systems, such as servers (not shown). The online learning system 200 includes a learning module 230, a database 240, and a file system 250. These components may have some or all of the same functionality described above with respect to FIG. 1, as well as additional functionality described below. In certain embodiments, the online learning system 200 advantageously enables teachers and administrators to define learning outcomes for capturing student performance.

The learning module 230 in the depicted embodiment includes a course creation module 232, an online classroom module 234, and a performance capture model 236. The learning module 230 may include more or fewer components in other embodiments.

The course creation module 232 can be a software component for creating courses, such as online courses. The course creation module 232 may be used by course creators such as teachers and administrators to create the online courses. When creating the online courses, course creators can use the course creation module 232 to define, import, or otherwise create learning outcomes. For instance, the course creation module 232 can allow course creators to import learning outcomes and assessments from previously-generated courses, which may be stored in the database 240 or file system 250.

Figure 3:
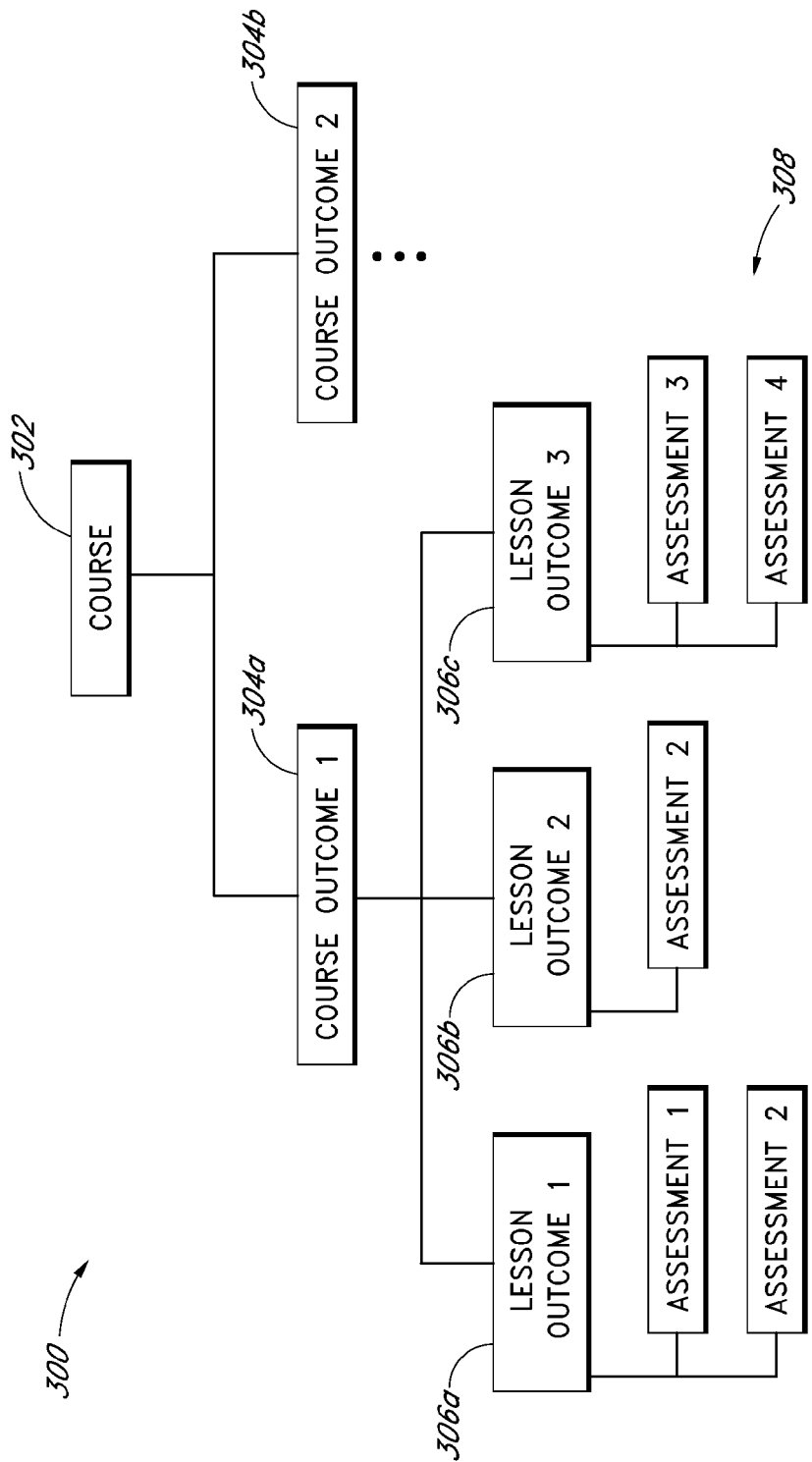
FIG. 3 illustrates a block diagram of an embodiment of learning outcomes that may be used with the online learning system of FIG. 1 or 2.

The learning outcomes can be subdivided into different types of learning outcomes. To illustrate, FIG. 3 depicts an embodiment of learning outcomes 300 that are subdivided into course outcomes 304 and lesson outcomes 306. The learning outcomes 300 are arranged hierarchically. For a given course 302, one or more course outcomes 304 may be defined. The course outcomes 304 may be overall objectives for students to achieve by the end of the course 302. Examples of course outcomes 304 for a geometry course 302 might include: "By the end of this course, students should be able to compute the area of common shapes" and "By the end of this course, students should be able to prove common geometric theorems." Two course outcomes 304a, 304b are shown for illustrative purposes; however, any number of course outcomes 304 may be defined for a given course 302.

For one or more of the course outcomes 304, there are one or more lesson outcomes 306 shown. For clarity, lesson outcomes 306 are shown for only the course outcome 304a, although lesson outcomes 306 may also be defined for the course outcome 304b. Each of the lesson outcomes 306 may be narrower in scope than the course outcome 304 with which it is associated. The lesson outcomes 306 can therefore support the course outcomes 304 in certain embodiments. Example lesson outcomes 306 might include: "By the end of this lesson, students should be able to compute the area of triangles" and "By the end of this lesson, students should be able to compute the area of parallelograms."

Each of the lesson outcomes 306 may be further associated with one or more assessments 308. The assessments 308 can be given to students to measure their progress toward completing the lesson outcomes 306, which can in turn show the progress of students toward completing the course outcomes 304. For example, a quiz on "computing the area of parallelograms" could be provided as an assessment 308 that supports the lesson outcome 306 of "By the end of this lesson, students should be able to compute the area of parallelograms." Thus, by measuring students' performance on the assessments 308, the students' performance toward completing the learning outcomes 300 can be captured.

While the assessments 308 are depicted as each relating to one lesson outcome 306, the assessments 308 may also relate to multiple lesson outcomes 306 and/or course outcomes 304. For example, after three lessons have been taught, an assessment 308 such as a test that covers the learning outcomes 306 from all three lessons might be given to students. Likewise, lesson outcomes 306 can be associated with multiple course outcomes 304. Additionally, the assessments 308 may be taken outside of a lesson or class. Moreover, some course outcomes 304 may not be associated with any lesson outcomes 306. The hierarchy of learning outcomes 300 shown may also have fewer or more levels.

Referring again to FIG. 2, once course creators have created learning outcomes, they may use the course creation module 232 to develop lessons that support those learning outcomes. The learning outcomes can therefore be a blueprint for developing a course in some implementations. Course creators may also use the course creation module 232 to generate assessments to gauge student progress in achieving the learning outcomes. The course creation module 232 may store the assessments, data on correct answers for the assessments (where applicable), corresponding grade values for the assessments (where applicable), and the like as assessment data 244 in the database 240.

Course creators can use the course creation module 232 to associate some or all of the learning outcomes with assessments and to store the associations in one or more assessment-outcomes tables 242 in the database 240. The course creation module 232 can also allow course creators to create criteria for determining whether learning outcomes have been met. These criteria can also be stored in the assessment-outcomes tables 242.

One example of such criteria is grade thresholds. For some assessments, course creators can define grade thresholds that indicate a minimum (or maximum) grade that satisfies a given learning outcome. For example, a grade of 75 out of 100 might be used as a threshold grade, such that students receiving a 75 or above will be considered to have achieved a learning outcome. The threshold may be in the form of a percentage, a raw number, a letter grade, or the like. The threshold may also be as simple as a "Pass" grade on a pass/fail assessment.

Grade thresholds may also be used for portions of assessments. For example, teachers may give multiple grades to an assessment. An English paper, for instance, might be assigned one grade for content and another grade for grammar. Each grade of multi-grade assessments may have a threshold that corresponds to different learning outcomes. The thresholds can be the same or different. Referring again to the English paper example, the content grade might be given a threshold of "75" (on a 0-100 scale), whereas the grammar grade might be given a threshold of "85."

Another example criteria for determining achievement of learning outcomes is based on questions of assessments, rather than (or possibly in addition to) grades. For instance, individual questions within an assessment may be assigned to one or more learning outcomes. Questions 1-3 on a test, for example, might relate to one learning outcome, while questions 4-10 relate to another learning outcome. Thus, answering a certain question, number of questions, percentage of questions, or subparts of questions correctly can demonstrate achievement of one or more learning outcomes. In addition, one question or set of questions can correspond to multiple learning outcomes.

The course creation module 232 can allow course creators to weight assessments or portions thereof. For example, one assessment might be given a higher weight than another assessment in determining whether learning outcomes have been met. Similarly, subparts of assessments, such as questions, can be assigned different weights in determining whether learning outcomes have been met. Moreover, one subpart of an assessment (e.g., a question), can have multiple weightings for different outcomes. For example, one question might be related 25% to one lesson outcome and 75% to another lesson outcome.

Other example criteria that can be defined for achieving learning outcomes include the percentage of completion of an assessment (e.g., the percentage of classes attended by students). In addition, when the learning outcomes include both lesson and course outcomes, the criteria for achievement of a course outcome can be based on the number lesson outcomes achieved, the percentage of lesson outcomes achieved, or the like. Many other criteria may be defined for determining learning outcome achievement in various embodiments.

In certain embodiments, the online classroom module 234 generates the online classroom described above with respect to FIG. 1. The online classroom can be used by teachers to provide classroom instruction. In addition, the online classroom can include interfaces for giving assessments to students. The online classroom module 234 can store completed assessments in the assessment data 244. In addition, in some implementations, the online classroom module 234 can automatically grade at least some of the assessments. For example, the online classroom module 234 can access an answer key or the like stored in the assessment data 244 and compare the students' answers with the answer key. In other embodiments, at least some of the assessments are graded manually by a teacher, teacher's assistant, or the like. Some papers, for instance, might be graded by hand. Teachers can input manually-generated grades into the online learning system 200 using the online classroom module 234. The online classroom module 234 can store automatically or manually generated grades in the assessment data 244.

In certain embodiments, the performance capture module 236 can retrieve the completed assessments and other assessment data 244 from the database 240 or directly from the online classroom module 234. The performance capture module 236 can then analyze the completed assessments according to the criteria described above to determine whether learning outcomes were achieved. For example, the performance capture module 236 can compare the assessment data 244 to the criteria described above, such as grade thresholds or the like, to determine whether learning outcomes have been met. The performance capture module 236 can store its analysis in the database 240. In addition, the performance capture module 236 can generate reports on student performance and provide these reports to teachers, administrators, students, and the like. One example of a report is described below with respect to FIG. 7. Moreover, the performance capture module 236 can provide these reports to accreditation entities to show evidence of compliance with accreditation standards.

Figure 4:
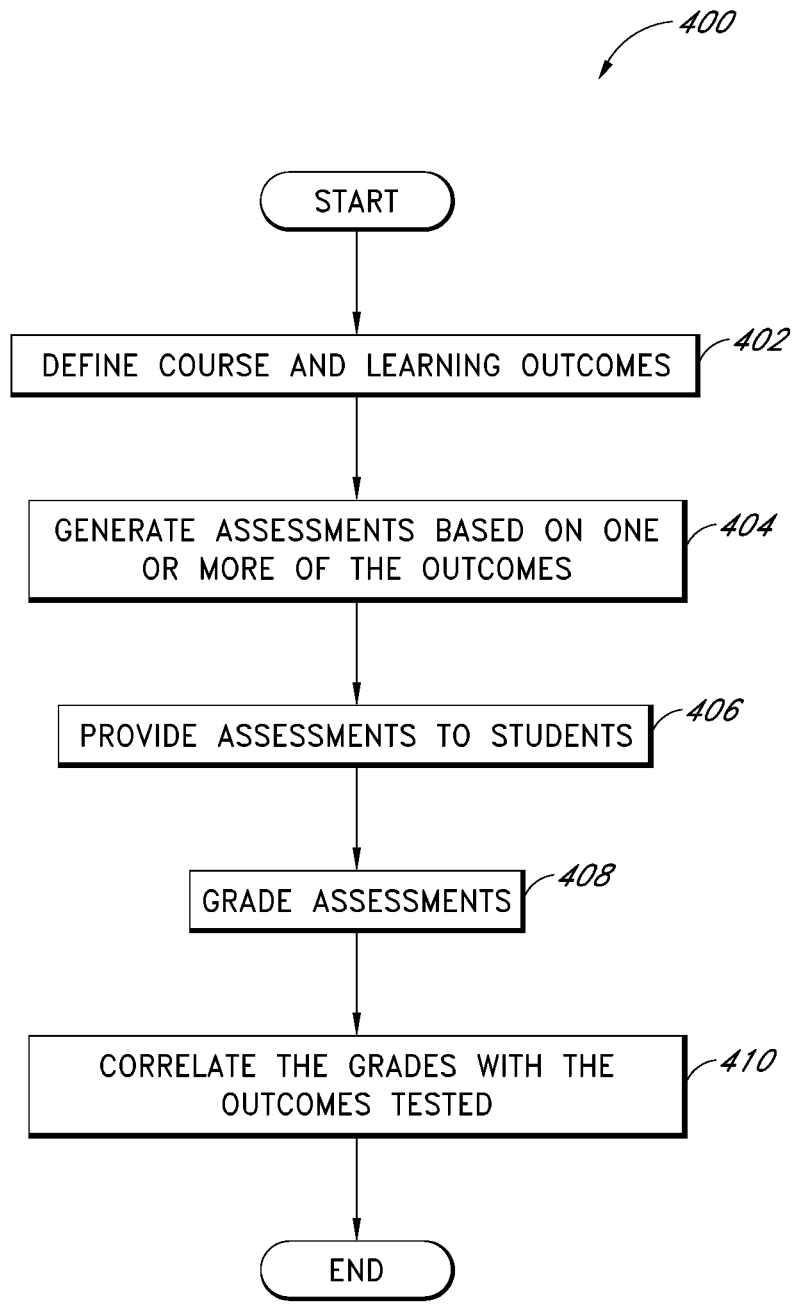
FIG. 4 illustrates a flow chart diagram of an embodiment of a process for capturing student performance.

FIG. 4 illustrates an example process 400 for capturing student performance. The process 400 can be performed by any of the online learning systems described above, such as the online learning systems 100 or 200. In particular, in certain embodiments, the course creation module 232, online classroom module 234, and performance capture module 236 described above can perform certain aspects of the process 400. Advantageously, in certain embodiments, the process 400 enables teachers or administrators to capture student performance.

At block 402, course and learning outcomes are defined. The course and learning outcomes can be defined using, for example, the course creation module 232. The course and learning outcomes can indicate objectives to which students should aim to achieve. At block 402, assessments are generated based on one or more of the outcomes. Each of the assessments can relate to one or more of the outcomes. This block 402 may also be implemented by the course creation module 232.

At block 406, the assessments are provided to students. Assessments can be taken by the students online in an interactive classroom using, for example, the online classroom module 234. At block 408, the assessments are graded. The assessments may be automatically graded by the performance capture module 236. Alternatively, the assessments can be hand-graded by a teacher, teacher's assistant, or the like. In the case of hand-graded assessments, the hand grades can be entered into the database 240 using the online classroom module 234 or the like.

At block 410, the grades are correlated with the outcomes tested to determine student and teacher progress with meeting performance goals. Block 410 may also be performed using the performance capture module 236. The individual questions may also be correlated with outcomes tested. More generally, any part of an assessment may be correlated with one or more learning outcomes.

Figure 5:
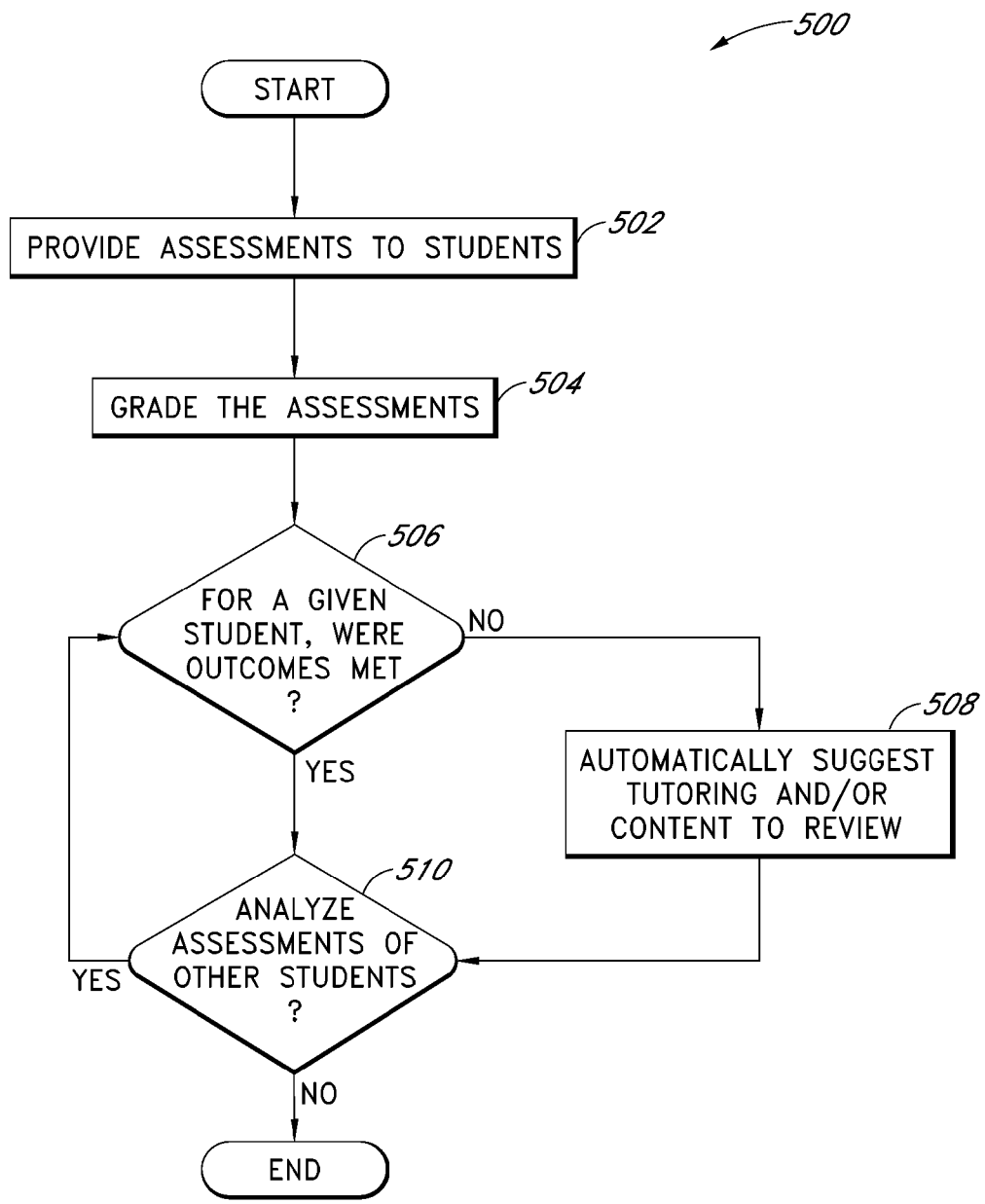
FIG. 5 illustrates a flow chart diagram of another embodiment of a process for capturing student performance.

FIG. 5 illustrates another embodiment of a process for capturing student performance. Like the process 400, the process 500 may be implemented by any of the online learning systems described above, such as the online learning systems 100 and 200. In particular, in certain embodiments, the online classroom module 234 and the performance capture module 236 described above can perform certain aspects of the process 500. Advantageously, in certain embodiments, the process 500 enables students to receive additional help if they are having difficulty achieving learning outcomes.

At block 502, assessments are provided to students. The assessments may be provided, for example, by the online classroom module 234. The remaining blocks 504-510 of the process 500 may be implemented by the performance capture module 236. At block 504, the assessments may be graded automatically or by hand. In the case of hand-grading, the grades may be entered into the performance capture module 236.

At block 506, it is determined for a given student whether one or more learning outcomes were met. This determination may include, for instance, analyzing assessments to determine if grades exceeded a predetermined threshold. If a student failed to achieve one or more outcomes, at block 508 tutoring can be automatically recommended to the student. Tutoring can be recommended, for example, by the performance capture module 236 sending an electronic message regarding tutoring to the student. The student may be recommended online tutoring for additional review in the subject matter of the one or more learning outcomes the student missed. The online tutoring may be performed in one embodiment using the online tutoring system described in U.S. patent application Ser. No. 12/137,422, filed Jun. 11, 2008, entitled "Computer systems and methods for providing online tutoring," the disclosure of which is hereby incorporated by reference in its entirety. Instead of tutoring, the student may be provided with additional content to review at block 508. This additional content may include lecture notes, outside reading material, or the like.

At block 510, it is determined whether to analyze the assessments of other students. If so, then the process loops back to block 506. Otherwise the process 500 ends.

Figure 6:
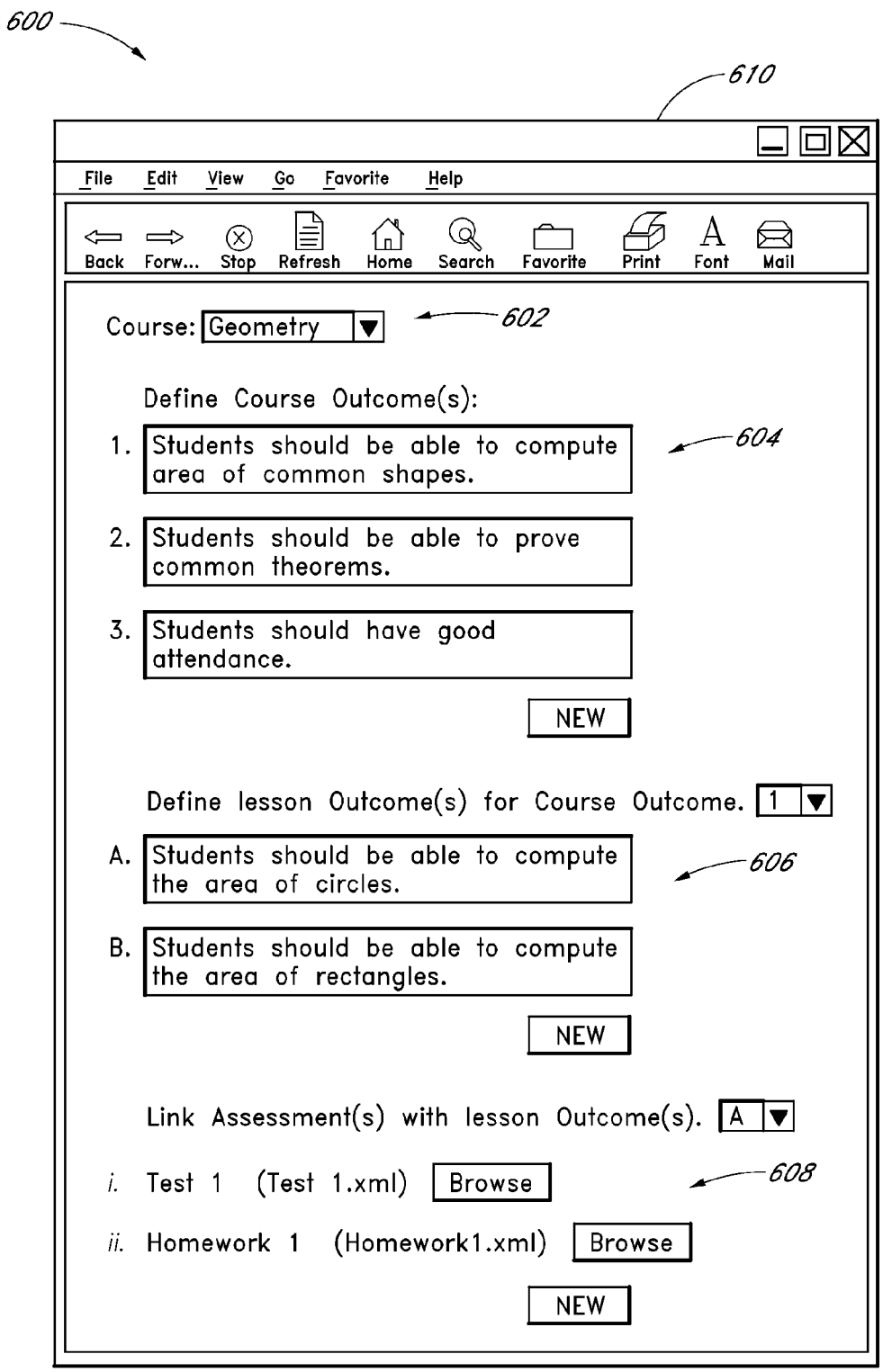
FIG. 6 illustrates an example user interface for creating an online course based on learning outcomes.

FIG. 6 illustrates an example course creation display 600 for creating an online course based on learning outcomes. The course creation display 600 may be generated by any of the online learning systems described above, including the online learning systems 100 and 200. In particular, in certain embodiments the course creation display 600 may be generated by the course creation module 232.

The example course creation display 600 is depicted in a web browser 610. In other embodiments, the course creation display 600 can be accessed using an application other than a web browser. The course creation display 600 may be included as part of several displays used to create a course. In certain embodiments, the course creation display 600 enables a course creator, such as a teacher or administrator, to create learning outcomes for a course.

The example course creation display 600 includes user interface controls 602 for selecting a course and user interface controls 604 for defining course outcomes for the selected course. The user interface controls 604 for defining course outcomes include text boxes in the depicted embodiment for entering descriptive text of a course outcome. For each course outcome, there are additional user interface controls 606 for creating lesson outcomes. These user interface controls 606 also include text boxes for entering descriptive text of a lesson outcome.

Similarly, user interface controls 608 may be used to link assessments with lesson and/or course outcomes. The user interface controls 608 include "Browse" buttons in the depicted embodiment for searching for assessment files. Other controls may be provided in certain embodiments for generating assessments from scratch. The assessments shown ("Test1.xml" and "Homework1.xml") are in extensible markup-language (XML) format. The XML format can be used in certain embodiments to facilitate parsing of answers from the assessments. However, many other formats can be used for the assessments in other embodiments.

FIG. 7 illustrates an example report display 700 for a report on student learning outcome performance. The report display 700 may be generated by any of the online learning systems described above, including the online learning systems 100 and 200. In particular, in certain embodiments the performance capture module 236 can generate the report display 700. The report display 700 may be used by a teacher, for example, to evaluate the progress of students in achieving learning outcomes.

The example report display 700 of the online classroom is depicted in a web browser 710. In other embodiments, the report display 700 can be accessed using an application other than a web browser. The report display 700 illustrates a lesson outcome report showing lesson outcome results for several students 708. For each student 708, assessment grades 712 corresponding to the depicted lesson outcome are shown in tabular format. The assessment grades 712 are combined into an average grade 714, which in the depicted embodiment is a weighted average.

Lesson outcome results 716 are also shown for each student. Where the average grade 714 meets or exceeds a threshold (in the depicted example, "85"), the lesson outcome results 714 indicate that the student 708 met the lesson outcome. Otherwise, the lesson outcome results 714 indicate that the student did not meet the lesson outcome.

Application Service Provider Embodiments

The Internet has provided educators with an efficient medium for delivering educational materials to a diverse, geographically remote audience. For example, many educational institutions provide educational content to students via the Internet. Many businesses and other organizations also offer continuing education and training to employees online. Online classes might include presentations of video lectures, written lecture notes, and the like.

Some educational institutions, businesses, and other organizations employ the hosting services of businesses called application service providers (ASPS). ASPS own or maintain computer systems such as servers that can host software, such as online learning software. Users such as students, teachers, and administrators can access the online learning software over the Internet or another communications medium. For example, the users might use a web browser or the like to access educational web pages or other educational network resources hosted on the ASP computer systems.

Security is a priority for ASPS. ASP security can include physical security, including physically secure facilities requiring, for example, badge or biometric access. In addition, ASPS generally attempt to secure their computer systems against software attacks and the like.

In hosting software for multiple organizations, ASPS may take steps to segregate each organization's programs and data stored on its servers for security and other reasons. ASPS may, for instance, run separate instances of the same program in computer memory for each organization. Likewise, ASPS may maintain separate databases and file systems for each organization. This duplication of running programs and data can be wasteful of computing resources, including processing, memory, and storage resources. In addition, the additional overhead of maintaining separate programs and data can create an administrative burden.

Certain embodiments herein describe systems and methods for providing a plurality of organizations, such as businesses, nonprofit organizations, government organizations, schools, and the like with access to hosted educational programs and data. In certain embodiments, these systems and methods can allow multiple organizations to share the same running instances of programs and share databases and file systems. As a result, in various implementations, computing resources can be conserved.

While the systems and methods herein are described primarily in the context of online learning, the systems and methods herein may be implemented in other contexts. For example, the systems and methods described herein may be implemented in any system having hosted software, such as ASP computer systems.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 8:
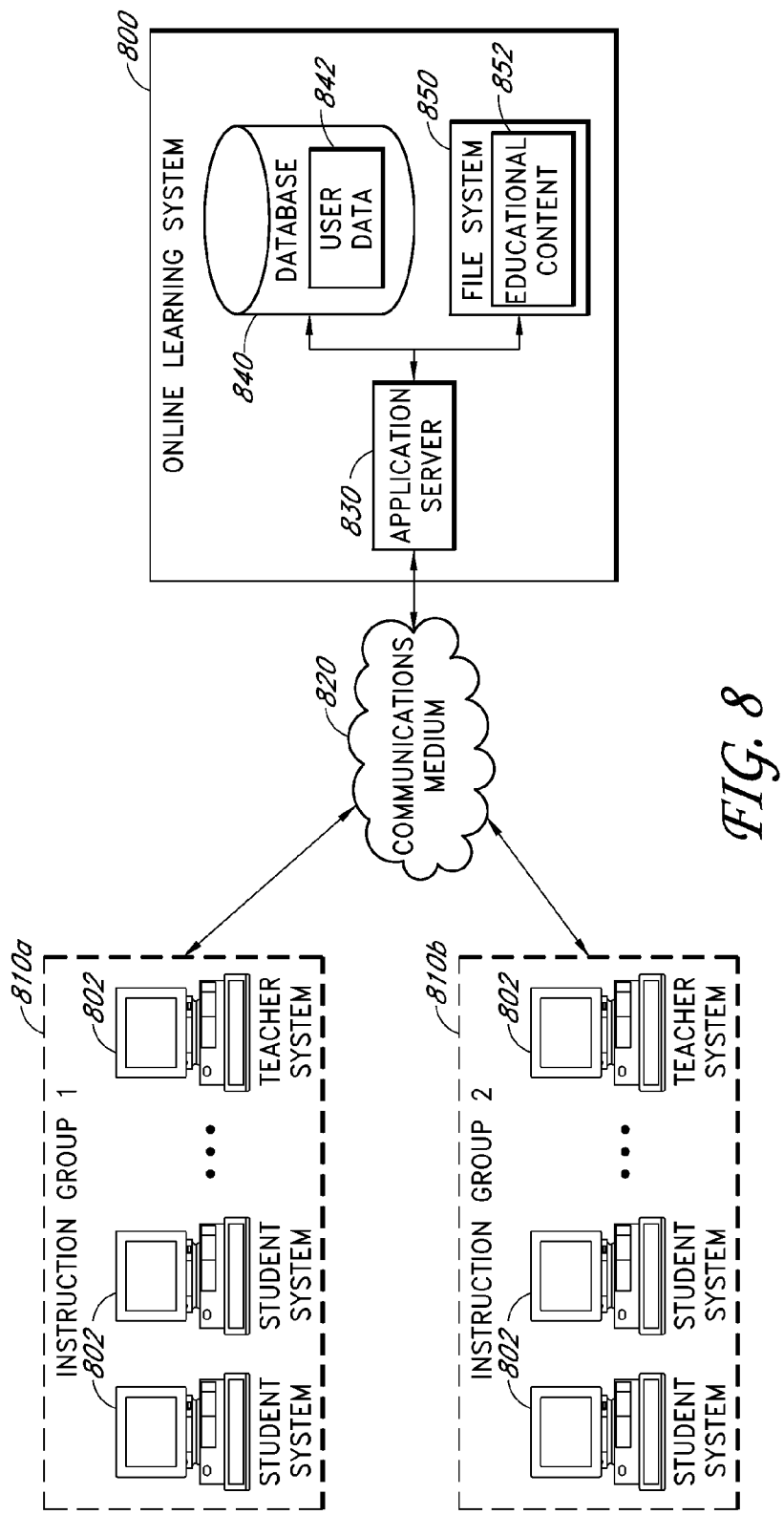
FIG. 8 illustrates a block diagram of an embodiment of an online learning system.

FIG. 8 illustrates an embodiment of an online learning system 800. The depicted embodiment of the online learning system 800 includes software components that can be implemented using one or more computer systems, such as servers (not shown). The online learning system 800 can be hosted by an ASP or the like. In certain embodiments, the online learning system 800 enables groups of users, including businesses, nonprofit organizations, government organizations, schools, and the like to access educational programs and data online.

The online learning system 800 may be accessed by users such as students, tutors, teachers, and/or administrators over a communications medium 820 such as the Internet, a local or wide area network (LAN or WAN), or the like. As used herein, the terms "student," "teacher," and "administrator," in addition to having their broad ordinary meaning, can include users who are not affiliated with an educational institution. A student, for example, can be any user who accesses the online tutoring system 800 to receive instruction. Similarly, a teacher or administrator can be any user who accesses the online learning system 800 to provide instruction and/or to perform administrative tasks related to the online learning system 800.

The users can access the online learning system 800 using computer systems 802. The computer systems 802 can be any processor-based systems, such as desktops, laptops, tablet computers, personal digital assistants (PDAs), smart phones, ultra-portable computers, and the like. Students may access the online learning system 800 to enroll in courses, receive instruction in online classes, complete homework assignments and projects, take tests and other assessments, and the like. Teachers may access the online learning system 800 to provide instruction to students, to create and manage courses, and the like. Administrators may also be able to access the online learning system 800 to supervise instruction and perform other administrative tasks.

The depicted online learning system 800 includes an application server 830, a database 840, and a file system 850. The application server 830 can be a software component such as a software engine or the like. The application server 830 can communicate with the users of the instruction groups 810 through the communications medium 820. The application server 830 can provide an online classroom in which students can be taught. The online classroom may include one or more user interfaces for communicating between students, teachers, and other students. The user interfaces can be accessed by web browsers or the like installed on the student and teacher computer systems 802. Alternatively, an application other than a web browser on the computer systems 802 can be used to access the online classroom provided by the application server 830.

The application server 830 can store user data 842, such as user contact information, student grades, class schedules, and the like, in the database 840. The application server 830 can also store educational content 852 and student and teacher data, including documents, files, and the like, in the file system 850. In some embodiments, the application server 830 can also store educational content and student and teacher data in the database 840. Through the online classroom or other user interfaces generated by the application server 830, students and teachers can access the data and educational content stored in the database 840 and file system 850.

The application server 830 may group users into instruction groups 810. Two instruction groups 810a, 810b are shown for illustrative purposes, but additional instruction groups 810 may access the online learning system 800. Entire organizations or parts thereof can be assigned to instruction groups 810. These organizations can include elementary or secondary schools (e.g., K-12 schools), higher education institutions (such as colleges, vocational schools, and universities), businesses, non-profit organizations, government organizations (e.g., military and agencies) and the like. Subsets of organizations that may be assigned to instruction groups 810 can include, for example, a group of corporate workers enrolled in a training program, a class of students at a university, and the like. In addition, users from different organizations (or no organization at all) may be assigned to instruction groups 810 in certain embodiments. For instance, users who have a common interest but who may be from different organizations may sign up for an online class and be grouped together as an instruction group 810. Users can simultaneously be in multiple instruction groups.

In certain embodiments, the instruction groups 810 are created by creating a unique instruction group identifier for each instruction group 810. The instruction group identifier can be an alphanumeric string or the like. The instruction group identifiers may be kept internal to the online learning system 800, such that users do not know of the instruction group identifiers' existence or of users' assignment to instruction groups 810. Instruction group identifiers may be mapped to users, and these mappings may be stored in the database 830, as is described in greater detail below with respect to FIG. 9.

In certain embodiments, assigning users to instruction groups 810 can allow certain software components of the online learning system 800 to be shared amongst different instruction groups 810. As a result, computing resources in the online learning system 800 may be used more efficiently and securely in certain implementations. To illustrate, in one embodiment, one running instance of the application server 830 may be shared by multiple instruction groups 810. This running instance of the application server 830 can run online classrooms and optionally other programs for each of the instruction groups 810. Similarly, data stored in the database 840 and file system 850 can be associated with the instruction group identifier of each instruction group 810 to facilitate sharing of the database 840 and file system 850. As will be described in further detail with respect to FIGS. 9 and 12 below, in various embodiments the application server 830, database 840, and file system 850 can be shared by providing access to programs and data according to the instruction group identifier for each instruction group 810.

Because the application server 830, database 840, and file system 850 can be shared by multiple instruction groups 810, in some embodiments these components can be implemented in one server or other computing device. Thus, in certain embodiments, each organization may not need to incur the costs of using a separate server to access educational content. In alternative embodiments, the application server 830, database 840, and file system 850 can be distributed over multiple servers, processors, and/or memory devices. Additionally, portions of the online learning system 800 may be loaded onto different processors, memory devices, or servers. For example, the application server 830 may be run on a different server than the database 840.

In still other embodiments, some components of the online learning system 800 may share resources differently than others. An instance of the application server 830 might be shared, for example, while separate databases 840 or file systems 850 may be maintained for each instruction group 810. In addition, one application server 830, database 840, and file system 850 might be shared amongst a first set of instruction groups 810, while another application server 830, database 840, and file system 850 might be shared by another set of instruction groups 810. Many other combinations of sharing application servers 830, databases 840, and file systems 850 may also be used.

Another advantage of using fewer application servers 830, databases 840, and file systems 850 for multiple instruction groups 810 in certain embodiments is that it can be easier to duplicate the entire online learning system 800. Duplicating the online learning system 800, or portions thereof, can allow the online learning system 800 to run on multiple servers for load balancing and fault tolerance purposes. In addition, in certain embodiments, the online learning system 800 uses fewer overhead computing resources because the communication between instances of multiple application servers, databases, and file systems is reduced or eliminated.

Figure 9:
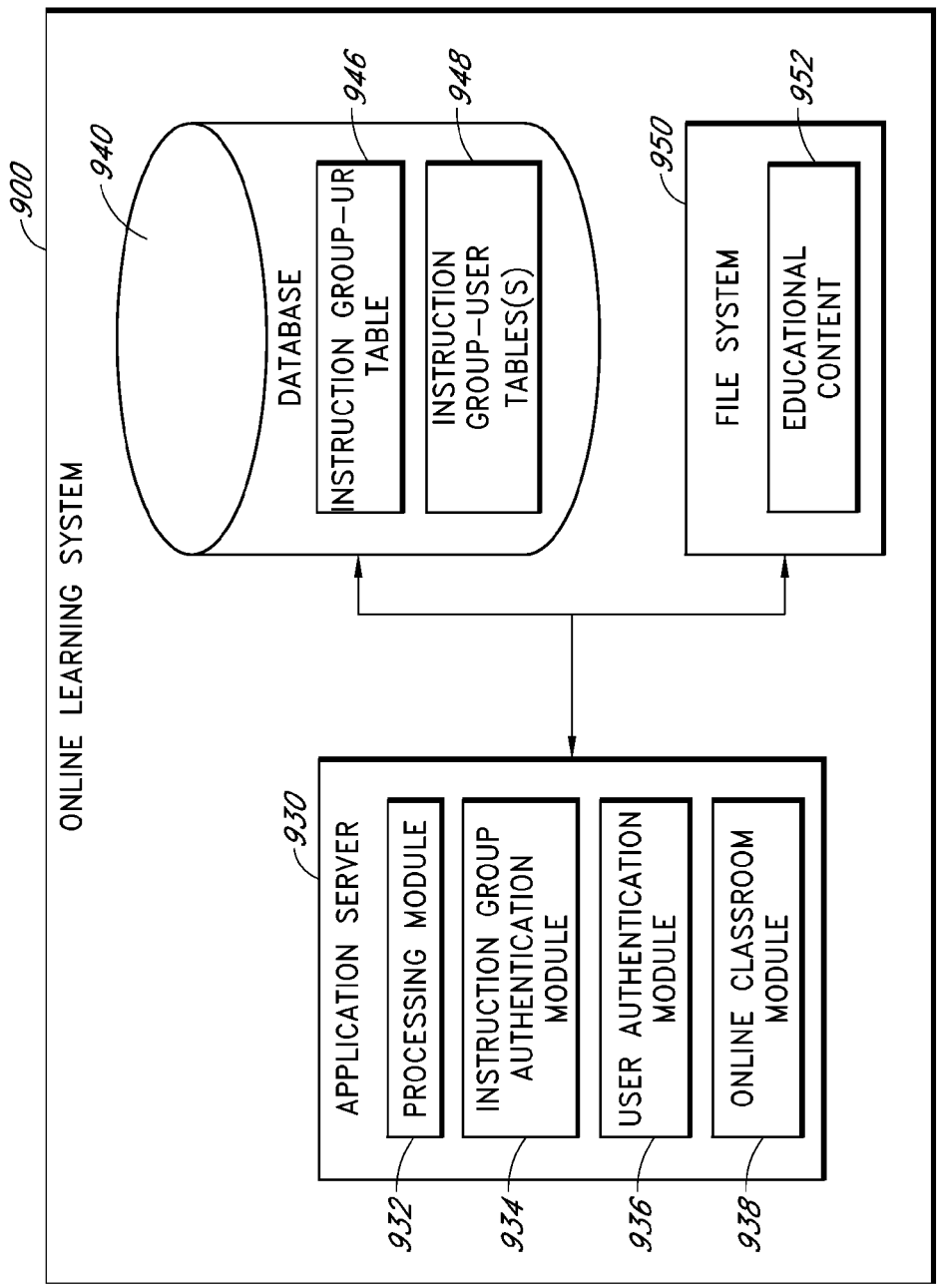
FIG. 9 illustrates a block diagram of another embodiment of the online learning system of FIG. 8.

FIG. 9 illustrates another embodiment of an online learning system 900. The depicted embodiment of the online learning system 900 includes software components that can be implemented using one or more computer systems, such as servers (not shown). The online learning system 900 includes an application server 930, a database 940, and a file system 950, which may have the same or similar functionality as described above with respect to FIG. 8. Advantageously, in certain embodiments, the online learning system 900 conserves computing resources by enabling organizations to share components of the online learning system 900.

The application server 930 in the depicted embodiment includes a provisioning module 932, an instruction group authentication module 934, a user authentication module 936, and an online classroom module 938. Fewer than or more than the depicted modules may be provided in other embodiments.

In certain embodiments, the provisioning module 932 can be a software component or the like that can group users into instruction groups. To assign users to instruction groups, the provisioning module 932 can assign or map an instruction group identifier to a set of users, such as all users in an organization. The instruction group identifier-user mappings can be stored in an instruction group-user table or tables 946 in the database 940. The instruction group identifier can be kept internal to the online learning system 900 and may therefore be concealed or made inaccessible to users of the instruction groups. As a result, in certain embodiments the security of the data for each instruction group can be enhanced.

The provisioning module 932 might assign the same instruction group identifier to each user of an organization, so that all users in that organization are grouped together as one instruction group. Alternatively, the provisioning module 932 may assign different instruction group identifiers for different sub-groups of users within an organization. For example, users in different college classes might be assigned different instruction group identifiers, so that each class is considered a distinct instruction group. Instruction group identifiers may also be assigned hierarchically in certain implementations. One instruction group identifier might be assigned to an organization, for instance, and different instruction group identifiers might also be assigned to sub-groups within that organization. Many other combinations of instruction group identifier assignments can be used in various embodiments.

Additionally, users can be assigned multiple instruction group identifiers because users might belong to multiple instruction groups. For example, one instruction group identifier might be assigned to a user for each class the user is enrolled with. If a user is attending two schools, the user might be assigned an instruction group identifier for each school. Or, in the case of hierarchically-assigned instruction group identifiers described above, a user might have an instruction group identifier for the organization the user is affiliated with and another instruction group identifier for each class the user is taking with that organization.

In addition to assigning instruction group identifiers, the provisioning module 932 can assign one or more uniform resource indicators (URIs) to each instruction group. Each URI may include a string of characters that can be used to identify one or more network resources, such as instructional web pages or web sites, online classrooms, and the like. The network resources can allow users to access educational content, student, teacher, and course data, and the like. The URI can be, for example, a Uniform Resource Locator (URL) that identifies network resources using a hypertext transfer protocol (HTTP) or the like. Thus, each instruction group may be assigned access to different online classes and educational course content using the one or more URIs. The mappings of URIs to instruction groups may be stored in an instruction group-URI table or tables 948 in the database 940.

The provisioning module 932 can also enable users to create user identification data, such as usernames and passwords, which users may use to log into the online learning system 900. The user identification data may be associated with one or more instruction group identifiers and stored in the instruction group-user table 948 of the database 940, or in a separate table.

Moreover, the provisioning module 932 can enable users to create or import educational content 952 into the file system 950, which may include student, teacher, and course files and data. At least some of the educational content 952 can also be stored in the database 940 in certain embodiments. In addition, the provisioning module 932 can associate the educational content 952 with instruction group identifiers. Examples of associating educational content 952 with instruction group identifiers are described in further detail below with respect to FIG. 12 (educational content and user data stored in a database) and FIG. 13 (educational content and user data stored in a file system).

The instruction group authentication module 934 can be a software component or the like that can receive user requests to access educational content 952 in the file system 950 and/or in the database 940. A user may send an access request by entering a URI into a web browser or other application on the user's computer system (see FIG. 8). The instruction group authentication module 934 may receive the access request over a communications medium, such as the communications medium 820 of FIG. 8. The instruction group authentication module 934 can obtain the URI entered by the user from the access request. Then, the instruction group authentication module 934 can use the URI to look up an instruction group identifier that corresponds to that URI in the instruction group-URI table 946. Upon finding the instruction group identifier related to that URI, the instruction group authentication module 934 can pass the instruction group identifier to the user authentication module 936.

The user authentication module 936 can be a software component or the like that can authenticate users prior to providing the users with access to the educational content 952 in the file system 950 and/or in the database 940. The user authentication module 936 can obtain identification data from the user who provided the access request. The user identification data can include login data such as a username and password. Alternatively, the user identification data can include cookie data or the like that is persistently stored on the user's computer system. The user authentication module 936 can then determine if the user identification data corresponds to a valid user by accessing, for example, the instruction group-user table 948. If the user identification data is stored in the database 940, the user authentication module 936 can determine that the user is a valid user.

The user authentication module 936 can further determine which instruction group the user belongs to by accessing the instruction group identifier corresponding to that user in the instruction group-user table 948. Then, the user authentication module 936 can compare the retrieved instruction group identifier to the instruction group identifier provided by the instruction group authentication module 936. If the two instruction group identifiers match, then the user authentication module 936 can determine that the user is a valid member of an instruction group. Additionally, the user authentication module 936 can provide the user with access to the online classroom module 938 and educational content 952 of that instruction group.

The online classroom module 938 can be a software component or the like that can enable the user to access an online classroom or other educational programs. Using the online classroom or other educational programs, the user can access the educational content 952 corresponding to the user's instruction group stored in the file system 950 and/or in the database 940.

Thus, in certain embodiments, by grouping users into instruction groups and associating educational content 952 with the instruction groups, the online learning system 900 can enable the database 940 and file system 950 to be shared by multiple groups of users. In addition, in certain embodiments the application server 930 can be shared by multiple groups of users, as is described in further detail with respect to FIG. 12 below.

Figure 10:
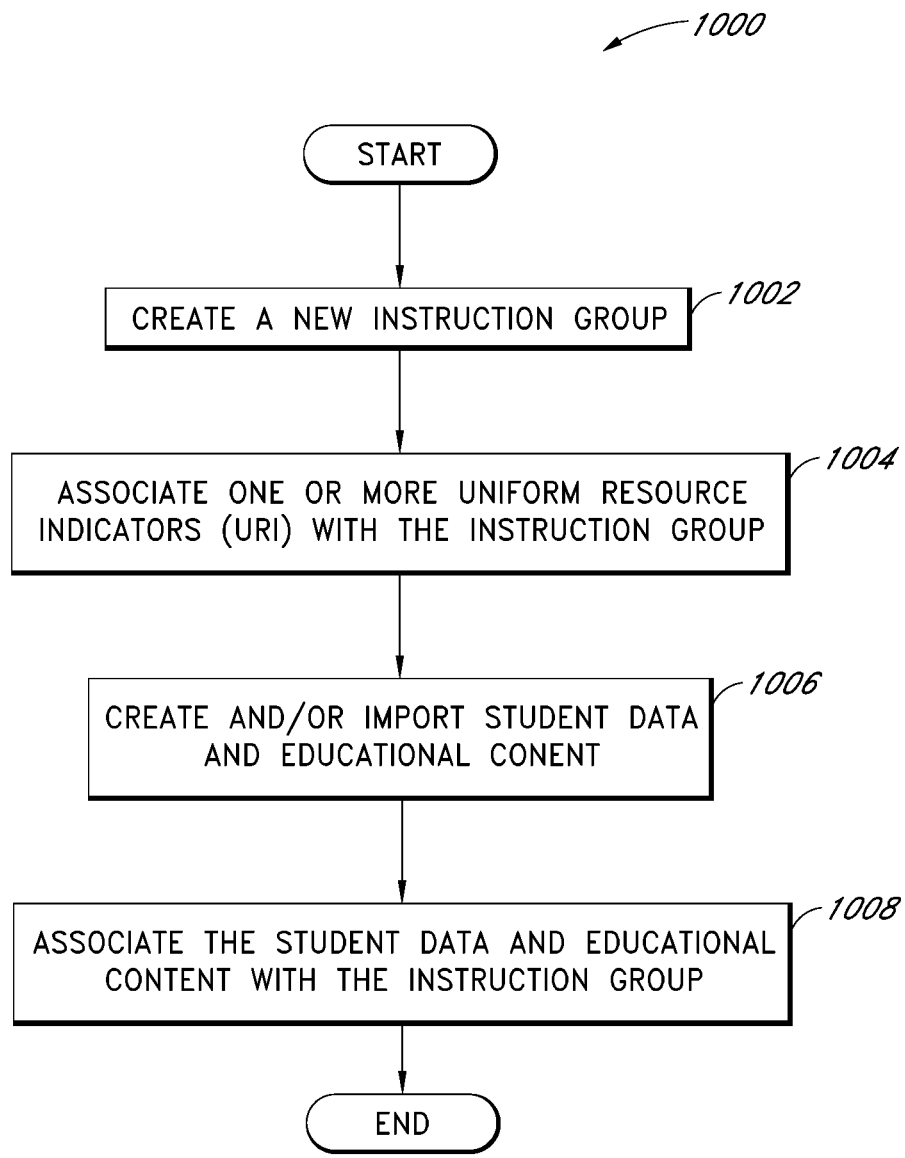
FIG. 10 illustrates a flow chart diagram of an embodiment of a process for provisioning instruction groups using the online learning system of FIG. 8 or 9.

FIG. 10 illustrates an embodiment of a process 1000 of provisioning users for accessing an online learning system. The process 1000 may be implemented in certain embodiments by any of the online learning systems described above, including the online learning systems 800 and 900. More particularly, certain blocks of the process 1000 may be implemented by the provisioning module 932 described above with respect to FIG. 9. The process 1000 in certain embodiments advantageously enables instruction groups to be created so as to facilitate secure sharing of computing resources in an online learning environment.

At block 1002, a new instruction group is created. The new instruction may include one or more users such as students, teachers, administrators, combinations of the same and the like. The instruction group can be assigned an instruction group identifier which can be stored in a database or the like.

At block 1004, one or more URIs are associated with the instruction group. The URIs can be associated further with one or more network resources such as online classrooms, web pages, and the like. In one implementation, the association of the uniform resource identifiers with instruction groups includes storing the instruction group identifiers together with the URIs in one or more tables of a database.

At block 1006, student data and educational content can be created and/or imported into an online learning system. The student data and educational content can be stored in a file system and/or a database. At block 1008, the student data and educational content can be associated with the instruction group by assigning or associating the instruction group identifier with the student data and educational content.

Figure 11:
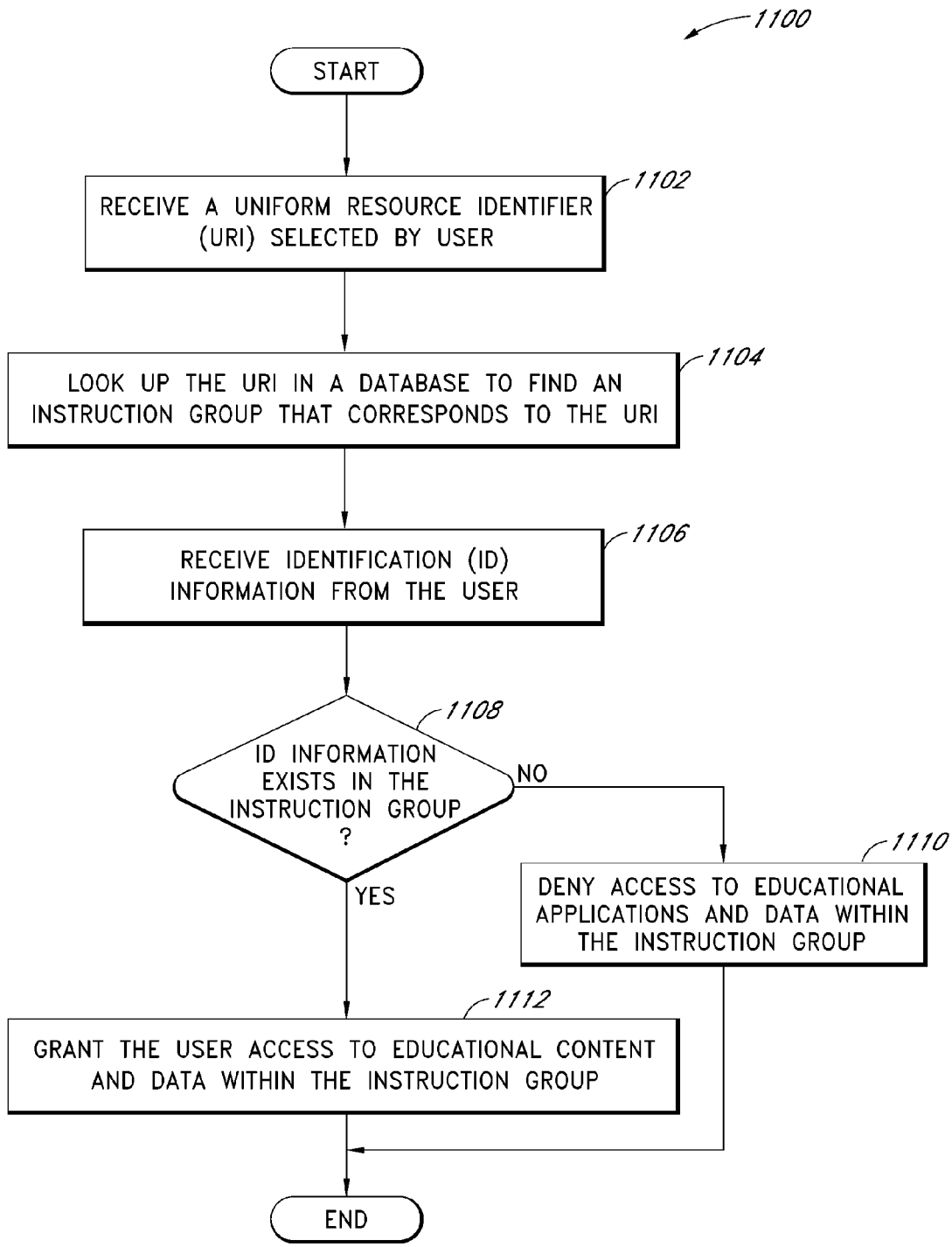
FIG. 11 illustrates a flow chart diagram of an embodiment of a process for authenticating users of instruction groups using the online learning system of FIG. 8 or 9.

FIG. 11 illustrates an embodiment of a process 1100 for authenticating users to use an online learning system. The process 1100 may be implemented by any of the online learning systems described above, including the online learning systems 800 and 900. In certain embodiments, the process 1100 can enable authentication of users of an online learning system in a manner that facilitates reduced computing resource consumption.

At block 1102, a URI selected by a user can be received, for example, by the instruction group authentication module 934 described above. The URI can be selected by the user to identify one or more network resources, such as an online classroom, through which the user can access educational content and data. At block 1104, the URI can be looked up in a database to find an instruction group that corresponds to the URI. This block 1104 may include obtaining an instruction group identifier that corresponds to the URI from the database. In an embodiment, block 1104 is also implemented by the instruction group authentication module 934.

At block 1106, identification information is received from the user. The identification information can include a username and password, persistently stored cookie data, combinations of the same, and the like. This block 1106 may be implemented, for example, by the user authentication module 936 described above.

It is determined at block 1108 whether the user identification information exists in the instruction group. Block 1108 may also be implemented by the user authentication module. Determining whether the user identification information exists for the identified instruction group can include accessing a table in the database to determine whether the user identification information exists in the database. If not, then the process 1100 proceeds to block 1110.

If, however, the user identification is stored in the database, block 1108 can further include retrieving an instruction group identifier from the database that corresponds to the user. If so, the instruction group identifier corresponding to the user can be compared to the instruction group identifier for the URI found in block 1104 above. If the two instruction group identifiers match, then at block 1112, the user is granted access to the educational content and data within the instruction group.

On the other hand, if the instruction group identifiers do not match, or if the user identification information is not valid (e.g., not in the database), the user is denied access to the educational content and data at block 1110. In certain embodiments, the process 1100 may be repeated each time the user selects another URI to access additional educational content, user data, or the like. Advantageously, in some implementations, if at any time the user selects a URI that belongs to another instruction group (accidentally or otherwise), the instruction group identifier of the user's group will not match the instruction group identifier of the other group. As a result, the user will be denied access to that instruction group's URI. Thus, in certain embodiments, educational content and data for different instruction groups are kept separate from one another.

Figure 12:
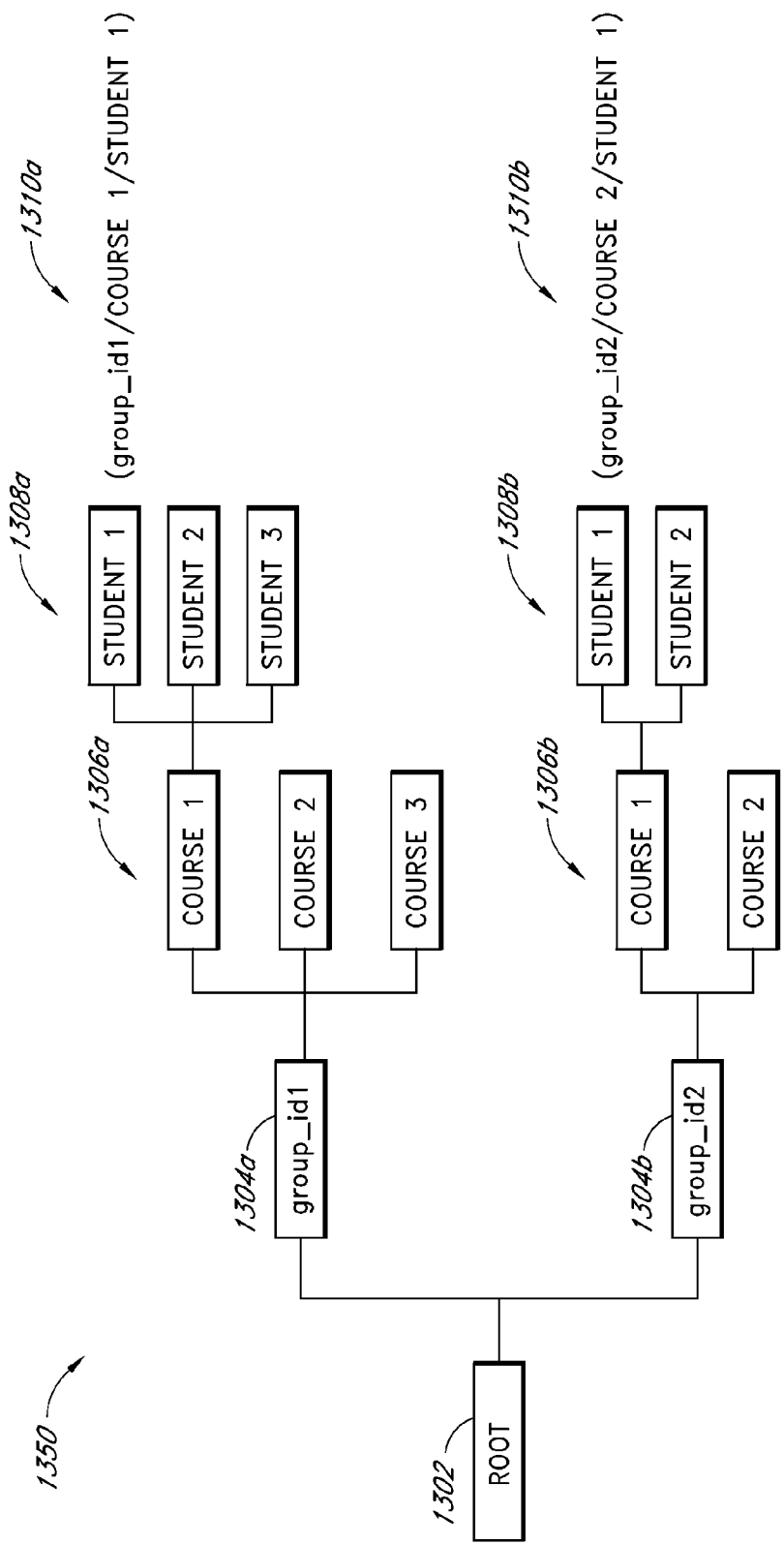
FIG. 12 illustrates a block diagram of an embodiment of a database of the online learning system of FIG. 8 or 9.

FIG. 12 illustrates an example database 1240 used that may be used with any of the online learning systems described above, such as the online learning systems 800 or 900. The database 1240 may, for example, be used as the database 840 or 940. The example database 1240 shown illustrates one possible implementation of associating instruction group identifiers with educational content, such as student, teacher, administrator, course, and other educational data.

Several example tables 1210 are shown, including tables 1210*a*, 1210*b*, and 1210*c*. Each table 1210 has one or more rows of data 1222. This data 1222 can include instruction group identifiers 1220. Although not shown, the data 1222 might also include any of the data described above, such as student data, course data, teacher data, administrative data, combinations of the same, and the like. The data 1222 might also include educational content, such as documents, spreadsheets, images, drawings, audio, video, and the like. In addition, at least some of the data 1222, while depicted in rows, may have other structures in various embodiments.

Within each table 1210, the instruction group identifier 1220 is included in each row 1222. Three different instruction group identifiers 1220 are shown, including group_id1, group_id2, and group_id3. Each instruction group identifier 1220 corresponds to one instruction group. Thus, in certain embodiments data 1222 appearing in a row with an instruction group identifier is associated with that instruction group.

As shown, different instruction group identifiers 1220 appear in each of the tables 1210. Accordingly, data 1222 from different instruction groups are included in each of the tables 1210. This need not be the case in certain embodiments; some tables 1210 may have data 1222 from fewer than all of the available instruction groups. However, by allowing the tables 1210 to include data from multiple instruction groups, the database 1240 in certain embodiments can be designed with one schema for multiple instruction groups. The database 1240 in certain embodiments can therefore be shared amongst instruction groups without duplicating tables. Because one common database schema is used, in certain embodiments one application server may be used to access the database 1240.

Figure 13:
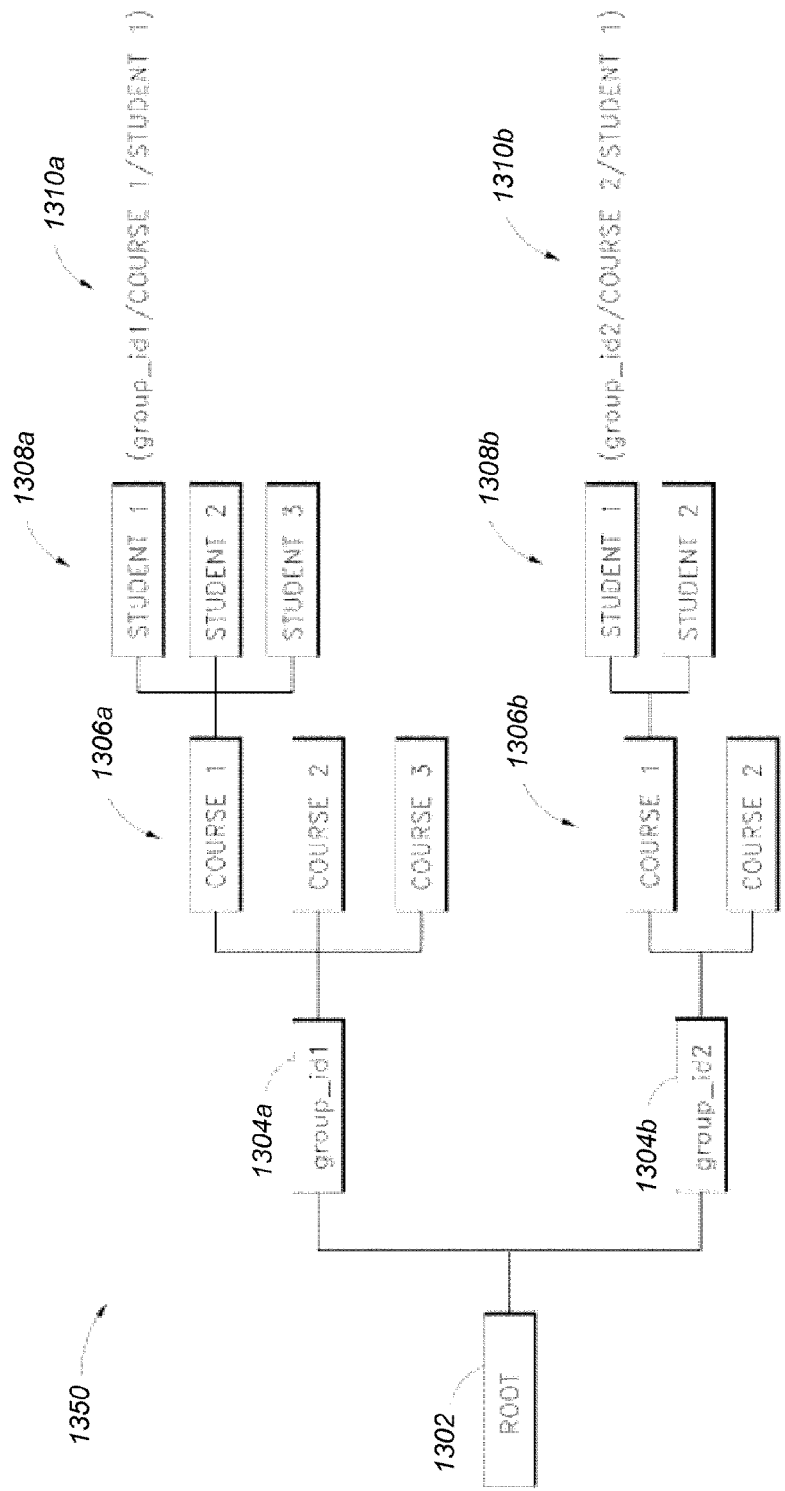
FIG. 13 illustrates a block diagram of an embodiment of a file system of the online learning system of FIG. 8 or 9.

FIG. 13 illustrates an example file system 1350 that may be used with any of the online learning systems described above, such as the online learning systems 800 or 900. The file system 1350 may, for example, be used as the file system 850 or 950. The example file system 1350 shown illustrates one possible implementation for associating instruction group identifiers with educational content, as well as student, teacher, administrator, and course files.

Blocks 1302 through 1308 of the example file system 1350 represent file folders, directories, or the like. The block 1302-1308 are arranged in a hierarchical structure with each block 1302-1308 as a node in the hierarchy. The highest node of the hierarchy in the depicted embodiment is the root folder, at block 1302. Within the root folder are instruction group identifier folders at blocks 1304. Two instruction group identifier folders are shown for illustrative purposes, namely group_id1 (block 1304*a*) and group_id2 (block 1304*b*). Each instruction group identifier folder corresponds to a different instruction group. In the depicted embodiment, the names of the instruction group identifier folders at blocks 1304 are instruction group identifiers. Thus, each instruction group identifier folder can contain files (including subfolders having files) for a particular instruction group corresponding to a particular instruction group identifier.

Within each instruction group identifier folder are course folders at blocks 1306. Each course folder can represent a different course available to the given instruction group. Each course folder may include files for a course, such as online lessons, assessments, multimedia, teacher files, and the like. In addition, within certain of the course folders are student folders, at blocks 1308. For conciseness, not all courses are shown with student folders. However, the other course folders may have student folders if students are enrolled in those courses. The student folders can contain student data, such as projects, homework, copies of assessments, and the like.

Two example file paths 1310 are shown, which can be used to access the files in the file system 1350. The filenames include the names of folders in the hierarchy, including the instruction group identifier folder (e.g., "group_id1" or "group_id2"), a course folder (e.g., "Course 1" or "Course 2"), and a student folder (e.g., "Student 1"). In an embodiment, some or all of the files in the file system 1350 may be accessed directly by students, teachers, and/or administrators. In other embodiments, some or all of the files in the file system 1350 are accessed indirectly by students, teachers, and/or administrators using an application server, such as the application server 830 or 930 described above. For example, a student might access course files from the file system 1350 indirectly through an online classroom, and the online classroom may programmatically access the files from the file system 1350 directly.

In alternative embodiments, the instruction group identifier folders 1304 may be at different levels in the file system 1350 hierarchy than that shown. Likewise, the course folders and student folders may be at different levels of the hierarchy, including on the same level. In addition, many other variations on the example file system 1350 depicted herein may be constructed.

TERMINOLOGY

Conditional language used herein, such as, among others, "can," "could," "might," "may," and the like, unless specifically stated otherwise, or otherwise understood within the context as used, is generally intended to convey that certain embodiments may include, while other embodiments may not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors, including sub-processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like. In certain embodiments, certain processes or modules described herein may be distributed over multiple processors or computers, such as servers.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. An online learning system for providing online learning using an application service provider system, the online learning system comprising:
    a database comprising a plurality of instruction group identifiers and associated network resource identifiers, each of the instruction group identifiers corresponding to one of a plurality of instruction groups, each of the instruction groups comprising a plurality of student users, each of the network resource identifiers configured to identify one or more network resources, wherein the network resources comprise uniform resource locators (URLs);
    a file system comprising educational content for each of the instruction groups;
    an application server implemented in computer hardware and configured to be accessed by the plurality of instruction groups, the application server comprising:
        a provisioning module configured to:
            assign one of the instruction group identifiers and one or more of the network resource identifiers to each of the instruction groups, each of the instruction group identifiers uniquely identifying a selected one of the instruction groups while being hidden from each of the instruction groups to prevent user access to the instruction group identifiers, wherein the instruction group identifiers are hidden by being stored in the database so that they are not directly accessible to the student users; and
            associate the instruction group identifiers with the educational content,
        an instruction group authentication module configured to:
            receive access requests from the student users from different ones of the instruction groups to access separate courses of the educational content stored in the file system, the access requests comprising different selected ones of the network resource identifiers from each of the instruction groups; and
            retrieve, in response to each of the access requests, a selected one of the instruction group identifiers corresponding to the selected network resource identifier from the database,
            such that for a selected one of the access requests from a selected one of the student users, the instruction group authentication module is configured to:
                obtain a URL entered by the selected student user from the selected access request; and
                use the URL to look up a first one of the instruction group identifiers that corresponds to the URL in a first table of the database, and
        a user authentication module configured to receive, with the access request, identification information from the selected student user, wherein the user authentication module is further configured to, in response to receiving the identification information from the selected student user and the first instruction group identifier from the instruction group authentication module:
            access a second table in the database to determine whether the identification information of the selected student user exists in the database,
            in response to determining that the identification information of the selected student user exists in the database, retrieve a second instruction group identifier from the database that corresponds to the selected student user, the second instruction group identifier corresponding to a selected one of the instruction groups,
            compare the first instruction group identifier provided by the instruction group authentication module to the second instruction group identifier corresponding to the selected student user,
            in response to determining that the first instruction group identifier matches the second instruction group identifier, granting the selected student user access to a selected one of the courses corresponding to the selected instruction group, and
            in response to determining that the first instruction group identifier does not match the second instruction group identifier, denying the selected student user access to the selected course, thereby preventing the selected student user from accessing those of the courses that are not associated with the selected instruction group of the selected student user; and
    an online classroom module configured to be executed by a computing system in a single computing instance in memory to provide each of the student users, including the selected student user, with simultaneous access to the educational content of the selected instruction group stored in the file system in response to receiving an indication from the user authentication module that the selected student user is a valid student user of the selected instruction group, without requiring multiple instances of the online classroom module to be executed, and wherein the use of the instruction group identifiers enables the database to have a single table schema for the plurality of instruction groups, thereby enabling the database to be shared by the plurality of instruction groups without duplicating tables for the plurality of instruction groups.

2. The system of claim 1, wherein the database comprises one or more tables comprising data from each of the instruction groups.

3. The system of claim 1, wherein the file system comprises a file hierarchy, wherein the educational content stored in the file hierarchy is configured to be accessed using a file path comprising the selected instruction group identifier.

4. The system of claim 1, wherein the plurality of instruction groups comprise a group of individuals within one or more of the following organizations: businesses, military, elementary schools, and secondary schools.

5. The system of claim 1, wherein each of the instruction groups comprise one or more teacher users.

6. The system of claim 1, further comprising a resource identifier table in the database, the resource identifier table associating each of the instruction group identifiers with one or more of the resource identifiers.

* * * * *